(12) United States Patent
Redtenbacher et al.

(10) Patent No.: US 9,695,737 B2
(45) Date of Patent: Jul. 4, 2017

(54) PRECHAMBER SYSTEM

(71) Applicant: GE Jenbacher GmbH & Co OG, Jenbach (AT)

(72) Inventors: Christoph Redtenbacher, Graz (AT); Hubert Winter, Graz (AT); Eduard Schnessl, Altenmarkt (AT); Peter Christiner, Graz (AT); Wolfgang Fimml, Jenbach (AT); Gerhard Kogler, Vienna (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 478 days.

(21) Appl. No.: 13/770,520

(22) Filed: Feb. 19, 2013

(65) Prior Publication Data

US 2013/0160734 A1    Jun. 27, 2013

Related U.S. Application Data

(63) Continuation of application No. PCT/AT2011/000351, filed on Aug. 19, 2011.

(30) Foreign Application Priority Data

Aug. 20, 2010   (AT) ................ A 1395/2010
Nov. 3, 2010    (AT) ................ A 1810/2010

(51) Int. Cl.
    F02B 19/12    (2006.01)
    F02B 19/00    (2006.01)
    F02B 19/10    (2006.01)

(52) U.S. Cl.
    CPC ............ *F02B 19/12* (2013.01); *F02B 19/00* (2013.01); *F02B 19/1004* (2013.01); *F02B 19/108* (2013.01); *Y02T 10/125* (2013.01)

(58) Field of Classification Search
    CPC ...... F02B 19/12; F02B 19/00; F02B 19/1004; F02B 19/108; Y02T 10/125
    USPC ....... 123/253, 255, 260, 261, 266, 274, 275, 123/285, 286, 287, 288, 263, 267
    See application file for complete search history.

(56) References Cited

U.S. PATENT DOCUMENTS

| | | | | |
|---|---|---|---|---|
| 2,262,981 A | * | 11/1941 | Weber .................... | 123/261 |
| 2,271,606 A | * | 2/1942 | Sheppard ............... | 123/286 |
| 3,068,845 A | * | 12/1962 | Leunig .................. | 123/255 |
| 3,179,091 A | * | 4/1965 | Leunig .................. | 123/263 |
| 4,006,720 A | * | 2/1977 | Sato et al. ............. | 123/263 |

(Continued)

FOREIGN PATENT DOCUMENTS

| | | |
|---|---|---|
| DE | 372 604 | 3/1923 |
| DE | 10 2004 016 260 | 10/2005 |

(Continued)

OTHER PUBLICATIONS

FR509236 (Fredrick Arther Smith) Nov. 4, 1920 (translation).*

(Continued)

*Primary Examiner* — Mahmoud Gimie
(74) *Attorney, Agent, or Firm* — Wenderoth, Lind & Ponack, L.L.P.

(57) ABSTRACT

A prechamber system for an internal combustion engine has a prechamber, a fuel introduction device, a dead space which connects the fuel introduction device to the prechamber. A channel is provided which connects the prechamber to the dead space.

6 Claims, 3 Drawing Sheets

(56) References Cited

U.S. PATENT DOCUMENTS

| | | | | |
|---|---|---|---|---|
| 4,116,191 A | * | 9/1978 | Yanagihara et al. | 123/259 |
| 4,129,100 A | * | 12/1978 | Habu | 123/293 |
| 4,149,495 A | * | 4/1979 | Miura | 123/260 |
| 4,170,968 A | | 10/1979 | Noguchi et al. | |
| 4,204,484 A | * | 5/1980 | Miura | 123/259 |
| 4,483,289 A | * | 11/1984 | Paul et al. | 123/263 |
| 4,635,598 A | * | 1/1987 | Tanaka et al. | 123/293 |
| 4,854,281 A | | 8/1989 | Hareyama et al. | |
| 6,129,059 A | | 10/2000 | Asai | |
| 2010/0132660 A1 | * | 6/2010 | Nerheim | 123/260 |

FOREIGN PATENT DOCUMENTS

| | | |
|---|---|---|
| DE | 10 2008 015 744 | 10/2009 |
| EP | 0 276 193 | 7/1988 |
| FR | 509236 A * | 11/1920 |
| GB | 207 181 | 6/1924 |
| JP | 56-157320 | 12/1981 |
| JP | 1-145941 | 6/1989 |
| JP | 2-69022 | 3/1990 |
| JP | 2001-82148 | 3/2001 |
| JP | 2002-266645 | 9/2002 |

OTHER PUBLICATIONS

International Search Report (ISR) issued Nov. 7, 2011 in International (PCT) Application No. PCT/AT2011/000351.
Austrian Patent Office Search Report (ASR #1) completed Jan. 25, 2011 in Austrian Patent Application No. A 1395/2010.
Austrian Patent Office Search Report (ASR #2) completed Apr. 13, 2011 in Austrian Patent Application No. A 1810/2010.

* cited by examiner

PRECHAMBER SYSTEM

BACKGROUND OF THE INVENTION

The invention relates to a prechamber system and an internal combustion engine with such a prechamber system.

In internal combustion engines (combustion engines), above a particular capacity, the energy of an ignition spark is no longer sufficient to reliably ignite the combustion gas/air mixture—which for emissions reasons is often very lean—in the main combustion chamber. To increase the ignition energy, in a prechamber which is connected with the main combustion chamber via channels, a small part of the mixture is enriched with a small quantity of combustion gas or an additional fuel and ignited. Combustion propagates in the form of ignition flares via the overflow channels out of the prechamber into the main combustion chamber and there ignites the lean mixture.

DE 10 2008 015 744 A1 describes, for example, an ignition device with prechamber into which opens a combustion gas nozzle (gas valve) which is connected to a high-pressure combustion gas line in order to introduce combustion gas into the prechamber under high pressure. Here, the combustion gas is mixed with a leaner (super-stoichiometric) combustion gas/air mixture present in the prechamber and enriches it. An ignition device protrudes into the prechamber to ignite the enriched combustion gas/air mixture and thus finally to ensure ignition of the combustion gas/air mixture present in the main combustion chamber.

In these so-called gas-flushed prechambers, a specific gas quantity is metered into the prechamber during the intake and/or compression stroke via a valve. At around the same time, a super-stoichiometric ($\lambda$>1) gas-air mixture is supplied to the main combustion chamber via the inlet valve. An engine operated on the "flushed prechamber" principle is described for example in DE 10 2004 016 260 B4 (Caterpillar).

On the compression stroke, lean mixture flows from the main combustion chamber into the prechamber and there mixes with the rich mixture already present. The aim is to achieve a stoichiometric composition ($\lambda$~1) for an ignitable mixture with high ignition energy.

U.S. Pat. No. 6,129,059 A (HONDA MOTOR CO. LTD.) describes an internal combustion engine and the arrangement of channels between the main combustion chamber and the prechamber.

U.S. Pat. No. 4,170,968 A (TOYOTA MOTOR CO. LTD.) describes in more detail the arrangement of the overflow channels in the prechamber and the position of the spark plugs in relation to these channels.

DE 10 2004 016 260 (CATERPILLAR MOTOREN GMBH) discloses a gas engine with a prechamber into which gas flows via a channel. The cylinder head of a gas engine shown has a flushed prechamber and a separate gas supply channel to supply a combustion chamber with gas for the ignition energy, wherein the ordinary ignition process takes place via a spark plug. A magnetic valve is arranged in a receiver region in the gas supply channel, and the outlet opens directly into the combustion chamber.

DISADVANTAGES OF THE PRIOR ART

Whereas a more or less homogenous mixture is achieved in the prechamber up to the time of ignition, in the channel (space) which connects the fuel introduction device (for example, a prechamber valve) with the prechamber (this space is referred to below as the dead space), a rich zone remains in which soot formation occurs during combustion.

This zone is not reached by the flow of lean mixture occurring on load change in the prechamber.

Publications EP 276 193 A2, JP 2069022 U, JP 1145941 U and JP 2001082148 A each show a prechamber system for an internal combustion engine, wherein a channel is provided which runs such that in the prechamber system installed in the combustion engine, it connects a main combustion chamber of the internal combustion engine with the dead space.

Experiments have shown that connection of the main combustion chamber with the dead space indeed brings a certain improvement in relation to soot reduction but still leaves something to be desired.

FIG. 1a shows a prechamber system with a prechamber 10 formed by a prechamber wall 8. The channel 3 connects the dead space 2 with the main combustion chamber 5. It is arranged such that it opens directly into the dead space 2 in the region of the seat of the fuel introduction device 1 (for example, non-return valve). On the compression stroke, the channel 3 acts as a riser.

Due to the pressure gradient which occurs from the main combustion chamber 5 to the prechamber 10, lean mixture flows via the channel 3 from the main combustion chamber 5 into the dead space 2 and dilutes the rich mixture present there or flushes rich mixture into the prechamber 10. Thus, in the dead space 2 at the time of ignition, a leaner mixture is present than in a variant without flushing, which causes a great reduction in or prevents soot formation in the dead space 2.

SUMMARY OF THE INVENTION

The object of the invention is therefore to offer a measure to reduce, or in the best case prevent, locally richer (sub-stoichiometric) zones in the dead space in order to reduce or avoid the abovementioned negative consequences of locally rich zones (soot formation/efficiency losses).

This object is achieved by a prechamber system as described below and an internal combustion engine with such a prechamber system.

To avoid rich zones in the dead space and hence the formation of soot particles, in the prechamber according to the invention, the dead space is flushed. For this, an additional channel is provided which connects the dead space volume with the prechamber such that the dead space volume is flushed preferably using the pressure gradients naturally present on load change.

The internal combustion engine according to the invention can, for example, be a gas engine, in particular a stationary gas engine.

Advantageous embodiments of the invention are also described below.

DETAILED DESCRIPTION OF THE INVENTION

Figure 1A:
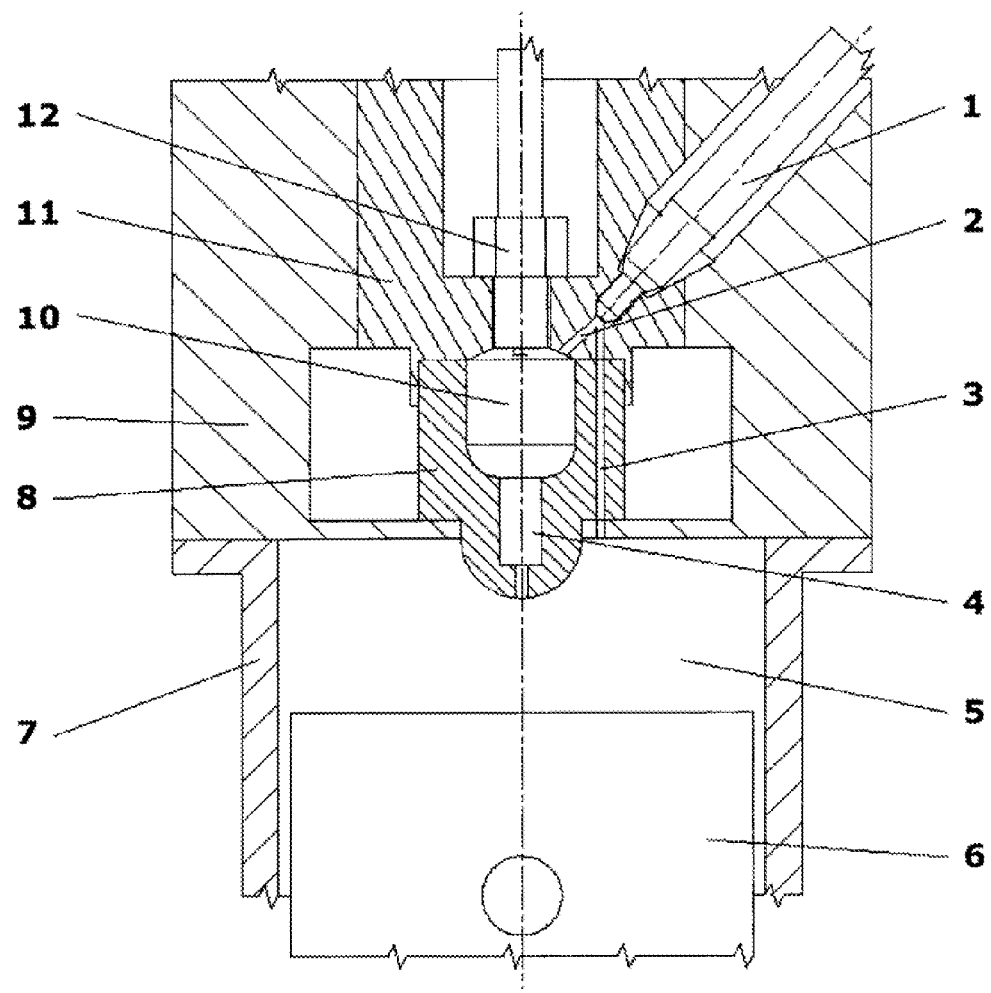
FIGS. 1a, 1b and 2 show diagrammatically a section of an internal combustion engine in the region of a cylinder head.
Figure 1B:
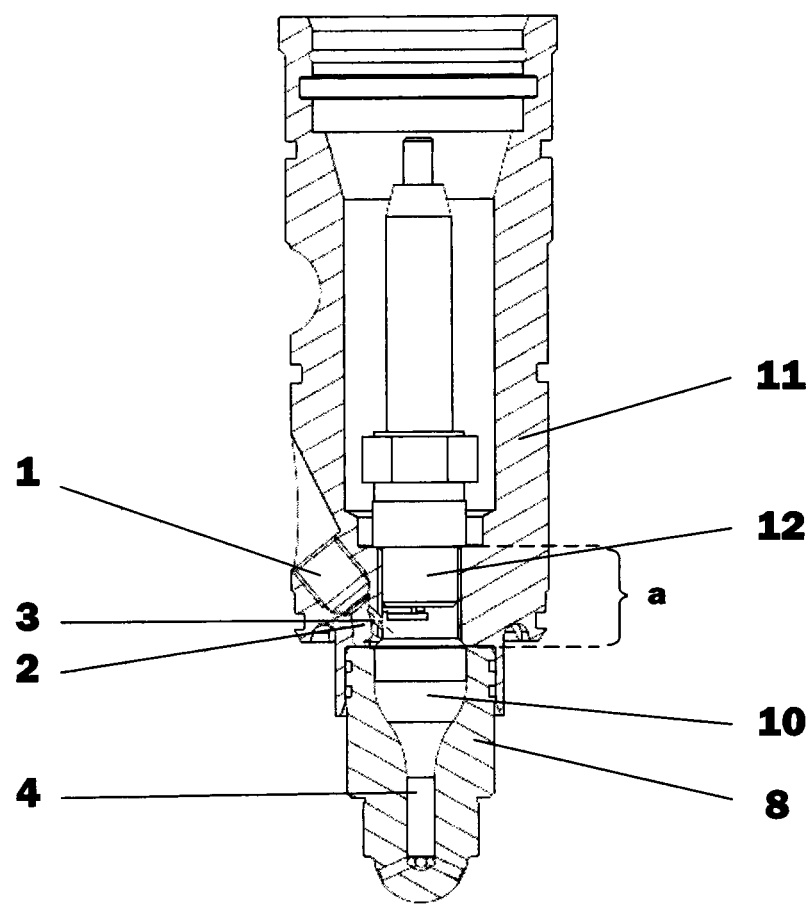

On FIG. 1b (variant according to the invention):

Here, the channel 3 opens into the prechamber 10 in the region of a fixing segment, which in this case is a thread (extending over region a) of the spark plug 12. This variant is more favorable for production than that the configurations of FIG. 1a or FIG. 2.

Figure 2:
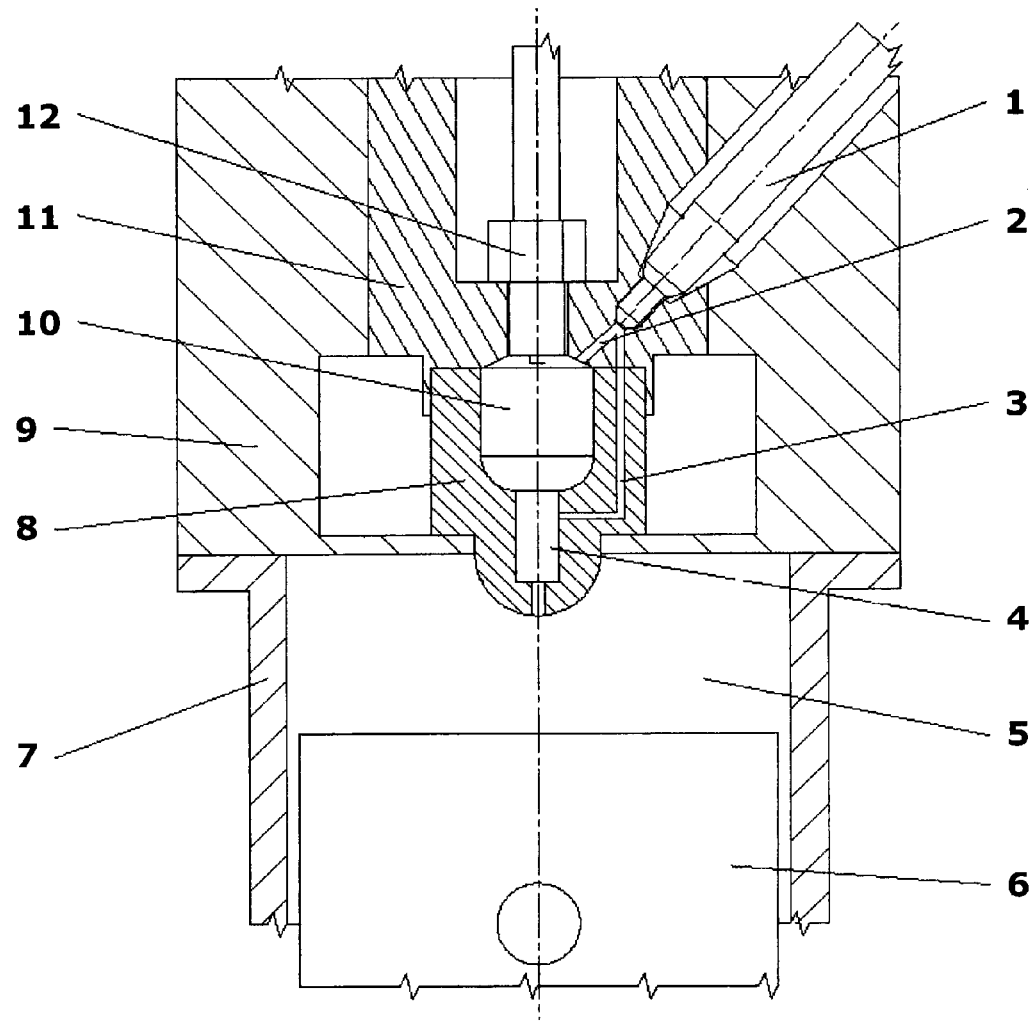

On FIG. 2 (variant according to the invention):

The channel 3 connects the dead space 2 (corresponding to the description above) with the overflow channel 4 of the prechamber 10. As can be seen from FIG. 2, the channel 3 forms a direct connection between the dead space 2 and the overflow channel 4 of the prechamber 10, meaning that only the channel 3 is located between the dead space 2 and the overflow channel 4 of the prechamber 10. On the compression stroke, high flow speeds occur in the overflow channel 4. Corresponding to the Venturi effect therefore, in the overflow channel 4 a reduced pressure occurs in comparison with the dead space 2. Thus, a rich mixture is extracted from the dead space 2 and mixed into the lean mixture flowing from the main combustion chamber 5 into the prechamber 10. This mixing has a positive effect on the mixing homogeneity in the prechamber 10. At the same time, lean mixture is drawn out of the prechamber 10 into the dead space 2, so that there at the time of ignition largely lean mixture is achieved which is above the soot formation limit.

1 Fuel introduction device, for example gas valve
2 Dead space
3 Channel for dead space flushing
4 Overflow channel
5 Main combustion chamber
6 Piston
7 Cylinder lining
8 Prechamber wall
9 Cylinder head
10 Prechamber
11 Spark plug sleeve
12 Spark plug

The invention claimed is:

1. A prechamber system for an internal combustion engine, comprising:
   a prechamber;
   a fuel introduction device;
   a dead space connecting said fuel introduction device with said prechamber; and
   a channel directly connecting said prechamber with said dead space.

2. The prechamber system of claim 1, further comprising a fixing segment formed as a thread to fix a spark plug to said prechamber, said channel being configured to open into said prechamber in a region of said fixing segment.

3. The prechamber system of claim 1, wherein said prechamber has an overflow channel, said channel being configured to directly connect said overflow channel of said prechamber to said dead space.

4. An internal combustion engine comprising:
   a main combustion chamber; and
   a prechamber system including:
      a prechamber;
      a fuel introduction device;
      a dead space connecting said fuel introduction device with said prechamber; and
      a channel directly connecting said prechamber with said dead space.

5. The internal combustion engine of claim 4, wherein said prechamber system further includes a fixing segment formed as a thread to fix a spark plug to said prechamber, said channel being configured to open into said prechamber in a region of said fixing segment.

6. The internal combustion engine of claim 4, wherein said prechamber has an overflow channel, said channel being configured to directly connect said overflow channel of said prechamber to said dead space.

* * * * *